Figure 1:
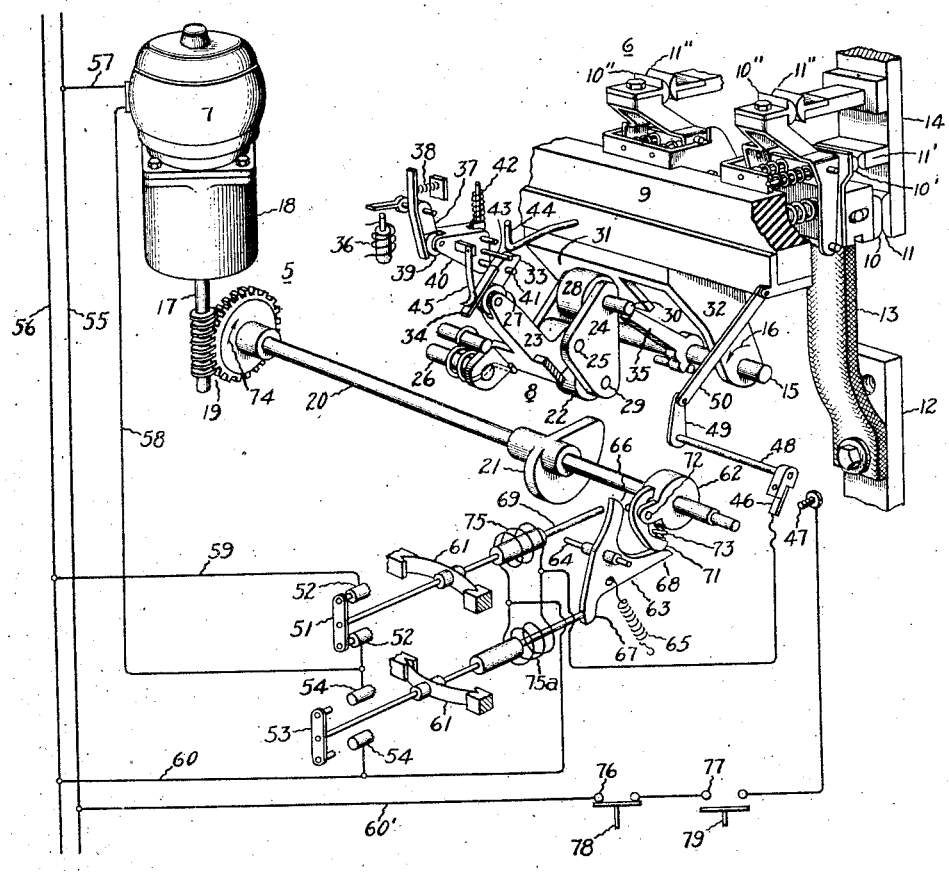

May 5, 1942.  R. W. SMITH  2,282,007
CONTROL OF MOTOR OPERATED DEVICES
Filed June 25, 1940  2 Sheets-Sheet 1

Inventor:
Robert W. Smith,
by Harry E. Dunham
His Attorney.

May 5, 1942.　　　R. W. SMITH　　　2,282,007
CONTROL OF MOTOR OPERATED DEVICES
Filed June 25, 1940　　　2 Sheets-Sheet 2

Inventor:
Robert W. Smith,
by Harry E. Dunham
His Attorney.

Patented May 5, 1942

2,282,007

UNITED STATES PATENT OFFICE 2,282,007

CONTROL OF MOTOR OPERATED DEVICES

Robert W. Smith, Folsom, Pa., assignor to General Electric Company, a corporation of New York Application June 25, 1940, Serial No. 342,281

8 Claims. (Cl. 175—375)

My invention relates to improvements in the control of motor operated devices and more particularly to the control of electric motor operated mechanisms for closing electric switches. The principal object of my invention is to provide an improved arrangement for so controlling the operation of a motor actuated device as positively to insure a completed single operation of the device and subsequent similar and necessary repeated operations thereof whereby to avoid unnecessary motor energizations and damage to the device or apparatus involved. This and other objects of my invention will appear in more detail hereinafter.

In so-called low voltage alternating current network systems, it is customary to use a network protector which includes a circuit breaker and protective relay means for effecting the closing of the circuit breaker only when a predetermined relation exists between the magnitude and phase angle of the voltage across the circuit breaker relatively to the voltage of the network. Usually the circuit breaker is actuated to the closing position by a motor operated mechanism which for obvious reasons is preferably of a trip-free type. The energization of the motor is initiated by the series related contacts of the protective relays and an auxiliary switch which closes when the circuit breaker opens and opens when the circuit breaker closes. In order to avoid uncertainties in the maintenance of the initiating circuit because of relay contact flutter and the difficulty of adjusting the circuit breaker auxiliary switch to conform to a definite position of the circuit breaker, it has been the practice to use a motor starting relay provided with a mechanical seal-in feature to insure a completion of the closing operation of the circuit breaker before deenergizing the motor. The mechanical seal-in feature was under the control of the motor mechanism. With such mechanisms difficulties occur due to coasting of the motor after deenergization at the end of the closing operation. Various arrangements have been proposed to eliminate these difficulties including the use of a brake for stopping the motor and its mechanically connected parts. Experience has shown, however, that this braking action cannot be definitely relied upon to stop the moving parts always in a definite position after the completion of the single closing operation. In consequence of this, it has happened that the motor could be repeatedly energized and also that in some arrangements no mechanical seal-in would occur under certain conditions. In the first case the motor might continue to run on indefinitely. In the second case repeated partial closures of the circuit breaker would occur with much damage to the arcing contacts in particular. These undesirable conditions arose in consequence of the failure of the mechanical seal-in device to function as intended by reason of the over-running of the motor.

In accordance with my invention, I provide an improved control arrangement such that coasting or over-running of the motor cannot so interfere with the sealing-in device as to prevent the completion of a single operation or to interfere with successive completed operations regardless of coasting of the motor mechanism. Further, in accordance with my invention, I provide a plurality of sealing-in contacts connected in parallel in the motor circuit such that, regardless of the coasting of the motor mechanism, at least one and possibly more of these contacts can be closed to effect the energization of the motor circuit in response to the initiating operation of the protective relays and the auxiliary switch associated with the circuit breaker.

My invention will be better understood from the following description when considered in connection with the accompanying two sheets of drawings, and its scope will be pointed out in the appended claims.

Figure 2:
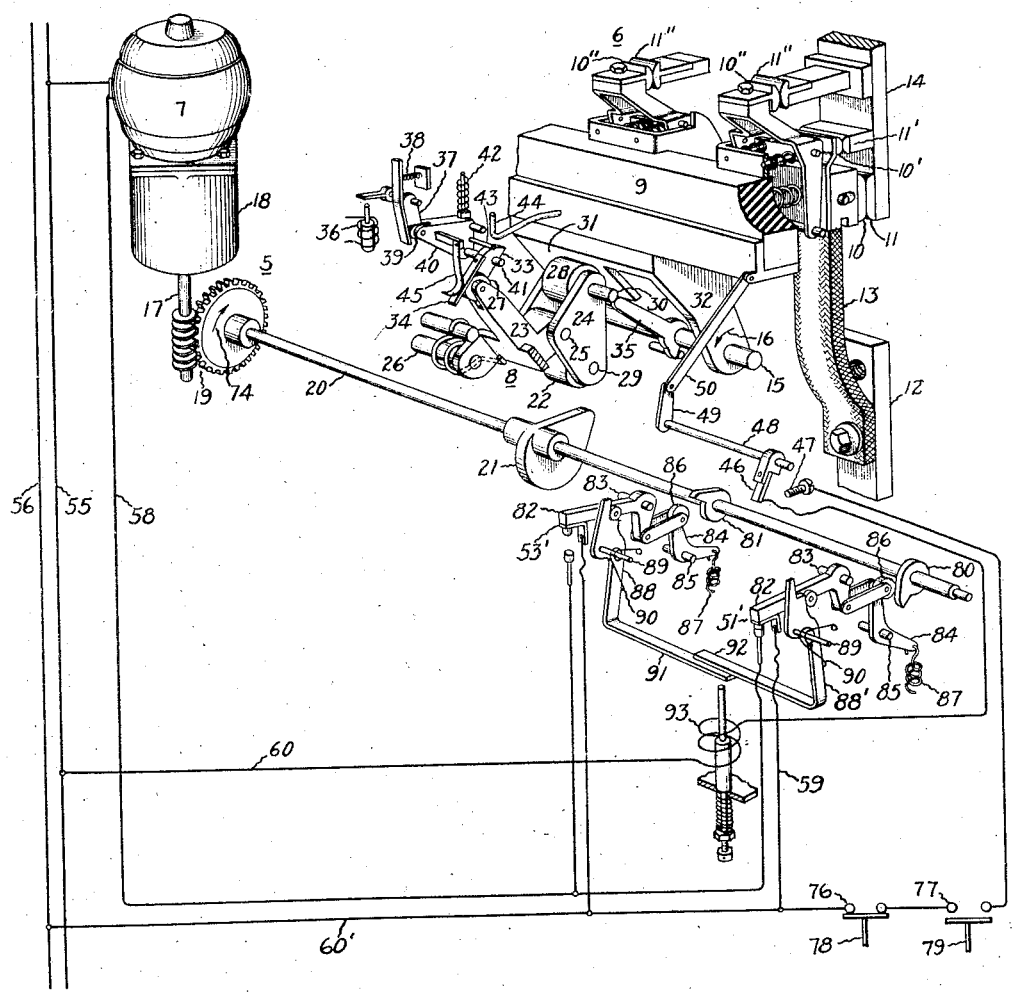

In the accompanying drawings Fig. 1 illustrates partly in diagram and partly in perspective an embodiment of my invention for the control of a circuit breaker, and Fig. 2 similarly illustrates a modification of the embodiment of my invention shown in Fig. 1.

For the purpose of illustrating my invention, I have shown in Fig. 1 an operating mechanism 5 for effecting a predetermined travel of the movable element of an electric circuit breaker 6. As shown, the operating mechanism comprises, in general, suitable actuating means such as an electric motor 7 and collapsible thrust transmitting means 8 which may be operatively related to the motor. The thrust transmitting structure is operatively connected to the movable element 9 of the circuit breaker. The particular structure so far described and, as illustrated, is disclosed in detail in United States Letters Patent 2,034,145 issued March 17, 1936 to the assignee of this invention. While I have chosen to illustrate a particular structure known to the art, it is to be understood that such structure is chosen merely for the purpose of illustrating my invention the application of which is not limited to such structure.

The circuit breaker 6 comprises a plurality of pairs of cooperating main, movable and stationary contacts 10 and 11 respectively, one pair for each phase of the circuit to be controlled. The contacts 10 are suitably mounted on the movable element 9. Each pole of the circuit breaker may also include a pair of relatively movable cooperating transfer or "burning" contacts 10' and 11' arranged in parallel with the main contacts 10 and 11. Besides these main and transfer contacts, suitable arcing contacts 10" and 11" and arc extinguishing means not shown may be provided as will be obvious to those skilled in the art. As shown, the power circuit through the circuit breaker comprises a terminal member 12 for each phase, a flexible conductor 13 interconnecting the terminal 12 with the movable contact 10 of the corresponding phase, a stationary contact 11 and a terminal member 14. The movable member 9 is pivotally supported on the fixed shaft 15 so that separation of the circuit breaker contacts occurs as the movable member 9 is turned in the direction of the arrow 16.

The operative relation between the motor 7 and the thrust transmitting structure 8 is effected through a shaft 17 connected to the motor 7 through a suitable braking mechanism which is housed in a casing 18, suitable speed reducing gearing 19 and a shaft 20 on which is mounted an actuating cam 21 coacting with the thrust transmitting structure 8. Energization of the motor 7 effects rotation of the actuating cam 21 and a circuit closing operation of the circuit breaker 6 through engagement of the actuating cam 21 with a roller 22 on the thrust transmitting mechanism 8. Inasmuch as the braking mechanism enclosed in the housing 18 is fully disclosed in United States Letters Patent 2,034,-145, supra, it is unnecessary to describe the structure further than to state that its function is to prevent overrunning or overtravel of the actuating cam except within relatively narrow limits so that the operating mechanism may be readily tripped, reset and reclosed, as necessary, without interference from the actuating cam. In general, the braking mechanism comprises a resilient connection between the motor shaft and the shaft 17 such that the braking effect is eliminated when the motor torque exceeds the torque of the resilient means employed and restored when it falls below this torque.

The thrust transmitting structure 8 is of the so-called trip-free type and is adapted to be reset and latched independently of the cam 21. As shown, the thrust transmitting structure comprises toggle members 23 and 24 which are pivotally interconnected at 25. The toggle member 23 is mounted on a fixed pivot 26 and carries at one end a roller 27 which coacts with latching and tripping means hereinafter described. As shown, the toggle member 24 is a triangularly shaped link carrying the roller 22 and a roller 28. These rollers are pivotally mounted at 29 and 30 on opposite sides of the pivotal support 25. The roller 22 is arranged to be in the path of the actuating cam 21 when the circuit breaker is to be closed, and the roller 28 is arranged to engage an inclined actuating face 31 of a pivotally supported member 32 which carries the movable circuit breaker element 9. The supporting member 32, which is pivotally mounted on the shaft 15, is biased to its open circuit position both by gravity and a suitable resilient means, not shown.

The circuit breaker mechanism is illustrated in the circuit closing position with the toggle 23, 24 overset so as to hold the element 9 in this position wherein the toggle is held by a pivoted latch member 33 which engages the roller 27. The latch 33 is provided with an extension 34 so as properly to position the latch with respect to the roller 27. When latched, the toggle is maintained in an overset thrust transmitting position by the fact that the reacting force of the circuit breaker is along the line of centers of the pins 25 and 30 and that this line is slightly offset with respect to the fixed pivot 26. Accordingly, there is a clockwise moment acting on link 23, which is restrained by the latch 33, so as rigidly to position the pivot 25. The inclined face 31 engaged by the roller 28 is normal to the plane of the axes of the pivots 25 and 30 so that the link 24 is in dead center position with respect to the toggle thrust. In order to avoid accidental movement of the link 24 about the pivot 25 due to vibration so as to avoid collapse of the toggle and opening of the circuit breaker, a prop 35 pivotally mounted on the shaft 15 is arranged to drop behind and brace the pivot pin 30.

The latch controlling and resetting means comprises an arrangement whereby a relatively small tripping force is effective to release a charged spring, or the like, for causing positive and quick release of the main latch 33. For this purpose a trip coil 36 is arranged to coact with a pivoted latch 37 which is biased by a spring 38 so as normally to engage a roller 39 carried by a trigger member 40. This trigger member, which is copivotally mounted at 41 with the latch 33, is biased by a spring 42 for clockwise rotation. The applied force of the spring 42 is slightly off center with respect to the pivot 41 so that the spring force is available immediately to rotate the trigger member 40 clockwise upon releasing movement of the latch 37. A pin 43 carried by the trigger member 40 is so arranged that, upon clockwise movement of this member the pin sharply strikes the latch 33 whereby to rotate the same clockwise to the toggle releasing position.

The resetting means for the latch and trigger arrangement described is such that immediately, upon collapse of the main toggle 23, 24 and the circuit opening movement of the element 9, the trigger 40 is reset and the latch 33 positioned so that it is in readiness immediately to latch the main toggle when the roller 27 returns to its initial position. The trigger resetting means comprises a member 44 carried by the element 9 and arranged to engage the trigger 40 and rotate the same counter-clockwise. The return of the trigger 40 to its initial position causes it to be engaged by the latch 37. The resetting operation of the circuit breaker element 9 also recharges the spring 42 by compressing the same against a fixed stop, not shown. The positioning of the latch 33 for relatching the roller 27 of the main toggle is accomplished by means of a resilient connection, such as a leaf spring 45, secured at one end to the trigger 40 and flexed so as to engage at its other end the latch 33 and bias the same for counter-clockwise rotation.

For controlling the closing operation of the circuit breaker in accordance with my invention, suitable switching means are provided and so arranged as to be closed when the circuit breaker is open and open when the circuit breaker is closed. As shown, this switching means comprises relatively movable cooperating contacts 46 and 47. For effecting movement of the contact 46 it may be mounted on a shaft 48 which is connected to the movable member 9 by suitable means, such as a crank 49 and a link 50, so as to partake of the movement of this member.

In accordance with my invention, I provide two independently operable switching means each of which is arranged independently to control the energization of the motor 7. As shown in Fig. 1, these switches are represented by a movable bridging contact 51 and cooperating stationary contacts 52, and a movable bridging contact 53 and cooperating stationary contacts 54. Also, as shown in Fig. 1, these switches are arranged in parallel branches of the energizing circuit of the motor 7 which is arranged to be energized from busses 55 and 56. The energizing circuit of the motor 7, starting with the bus 55, includes a conductor 57, the motor 7, a conductor 58, the switches 51, 53 and the parallel conductors 59 and 60 to the bus 56. Further, in accordance with my invention, each of the parallel connected control switches 51, 53 preferably is of the seal-in type such that it will be retained in both the circuit opening and circuit closing positions. As shown in Fig. 1, this may be accomplished by suitable resilient means such as overcenter leaf springs 61.

Further, in accordance with my invention, in order to effect a sequential operation of the switches 51, 53 after movement of the movable member 9 to the circuit closing position of the circuit breaker, I provide means for sequentially opening the switches 51, 53 which operates in dependence on the angular position of the operating shaft 20 or, more properly speaking, the operating cam 21. As shown in Fig. 1, this means is a cam-actuated mechanism comprising a switch operating member 62 mounted on the shaft 20 and a rocking lever 63, which is pivotally supported at 64 and which may be biased to a neutral position by suitable means, such as a spring 65. As shown, the rocking lever comprises three arms 66, 67 and 68. Two of these arms 66 and 67 are arranged, upon counter-clockwise and clockwise movements of the member 63, respectively to engage push rods 69 and 70 whereby to effect circuit opening operation of the switches 51 and 53, respectively. In order to effect the desired sequential operation of these switches, the operating member 62 is provided with suitable cam means such as a cam lever 71 pivoted at 72 on the member 62 for a limited clockwise movement about this pivot under the bias of suitable means such as a relatively stiff spring 73. The purpose of this spring is to avoid damage to the push rods 69 and 70 if their travel is so limited that mechanical injury might result in case the cam lever 71 could not move counter-clockwise around its pivot 72. As shown, a bias tending to turn the rocking lever 63 in a counter-clockwise direction is imparted to the spring 65 as the cam lever 71 turns the rocking lever 63 clockwise to open the switch 53. The energy thus stored in the spring 65 is used to bring the rocking lever 63 back to a neutral position as the cam lever 71 is turned out of engagement with the arm 68 and 66. In this neutral position of the rocking lever 63 both of the switches 51 and 53 may close when their windings 75 and 75a are energized if the cam lever 71 is not in engagement with one or the other of the arms 66 and 68.

The arrangement of the cam lever 71 relatively to the arms 66 and 68 of the rocking lever 63 is such that, as the shaft 20 is rotated in the direction indicated by the arrow 74, the cam lever 71 first engages the arm 68 of the rocking lever 63 to turn this lever clockwise and open the switch 53 to the position shown in Fig. 1. As the rotation of the shaft 20 continues, the cam lever 71 engages the arm 66 of the rocking lever 63 to rotate the rocking lever 63 counter-clockwise whereby to actuate the push rod 69 and open the switch 51.

With both of the switches 51 and 53 opened and held in this position by the overcenter action of the springs 61, further energization of the motor is impossible until these switches are restored to the closed position. Since the coasting or overrunning of the motor, depending on the stopping position of the operating shaft 20, may leave the cam lever 71 in engagement with one or the other of the arms 66 or 68, I provide means for insuring the switch closing action of at least one of the switches 51 and 53, or both, in the event that the cam lever 71 is clear of both arms 66 and 68 of the rocking lever 63. As shown in Fig. 1, this means is of the electromagnetic type and comprises suitable armature means arranged to be actuated upon energization of suitable winding means such as coils 75 and 75a, respectively operative to effect the closing action of the switches 51 and 53. For controlling the energization of these coils 75 and 75a they are preferably connected in parallel in a control circuit which comprises the conductor 60 and a conductor 60' and which is energized from the buses 55, 56 through a circuit including the circuit breaker auxiliary switch 46, 47 and the contacts 76 and 77 of the power directional and phasing relays, indicated schematically by 78 and 79, usually associated with the closing control of low voltage alternating current network protectors. As is well known to the art, the power directional means operates to close its contacts when it is possible for power to flow from the feeder to the network. The phasing relay operates to close its contacts only when a predetermined relation exists between the magnitude and phase angle of the voltage across the circuit breaker relatively to the voltage of the network.

Assuming the parts positioned as shown in Fig. 1, it will be obvious that the motor 7 has been energized to rotate the cam 21 in the direction of the arrow 74 and to effect thereby a closing operation of the circuit breaker 6. Also the cam shaft 20 has been rotated sufficiently for the rocking lever 63 to have opened the switch 53 but not the switch 51. Accordingly, the circuit of the motor is still completed through the switch 51, and the cam shaft 20 continues to rotate until the cam lever 71 engages the arm 66 of the rocking lever whereby to effect the opening of the switch 51. Thus, after the opening of both of the switches 53 and 51 in succession, the circuit of the motor 7 is deenergized. However, the motor tends to coast under the braking action to which it is subjected and, depending upon the effectiveness of such braking action, it is possible for the cam shaft 20 to come to rest with the cam lever 71 in the position shown in Fig. 1 where it is operative to prevent a closing of the switch 53 even though the winding 75a, which controls the closing operation of this switch, is energized. It is also possible for the cam shaft to come to rest with the cam lever 71 holding the switch 51 open so that this switch cannot be closed by energizing its winding 75. However, no matter what the position of the cam shaft 20 when the motor stops, no position of the cam lever 71 can prevent the closing of at least one of the switches 53 or 51.

Whenever the trip coil 36 of the circuit breaker 6 is energized to effect a release of the trigger 40 and thereby a spring tripping action of the latch 33 whereby to cause a collapsing of the toggle 23, 24 and the opening of the circuit breaker 6, the auxiliary switch 46, 47 will be closed. The energization of the trip coil 36 may be effected by the closing of the tripping contacts of a power directional relay which responds to cause the opening of the circuit breaker on the occurrence of a fault on a feeder supplying the network as is well known to the art.

With the circuit breaker open and the auxiliary switch 46, 47 closed, then, whenever the relays 78 and 79 act to complete the closing control circuit 60—60', both of the windings 75 and 75a, which control the closing operation of the switches 51 and 53, will be energized. As soon as this occurs, at least one or both of these switches will be moved to the closing position depending upon whether or not the rocking lever 63 has been stopped in a position to prevent the closing of one or neither. Upon the closing operation of one or both of these switches, the over-center spring 61 maintains the closed switch in the closed position. The closing of at least one of the switches 51, 53 effects the energization of the motor 7 and thereby the rotation of the cam 21 which, as it engages the roller 22, of the circuit breaker mechanism 8, effects the closing operation of this mechanism which, as will be obvious from the description heretofore given, resets itself during the opening movement of the circuit breaker.

It will be noted that the displacement of the ends of the rocking lever arms 66 and 68 is such that, even though the motor were started by the closing of the switch 51 with the cam lever 71 in the position shown so that the switch 53 cannot close upon energization of its winding 75a, the cam shaft 20, as it rotates carrying the cam lever 71 will however, open the switch 51 as the cam lever engages the arm 66. However, since the winding 75a of the switch 53 is energized, this switch will be closed immediately that the cam lever leaves the arm 68 which occurs before this lever engages the arm 66. In this way the motor circuit, once energized, is continuously energized until the circuit breaker is closed. Thus, regardless of the rest position of the cam shaft 20, there is, in accordance with my invention, always at least one switch available to effect and maintain the energization of the motor circuit after the opening of the circuit breaker and until the closing thereof whenever the protective relays function in accordance with their well known operation.

In the modification of my invention shown in Fig. 2, I have illustrated two switches 51' and 53' which are independently and separately operative in a predetermined sequence upon rotation of the cam shaft 20 by their respectively associated cams 80 and 81. As shown, each of these switches comprises a movable member 82 pivoted as at 83 and in the form of a bell crank, which is inter-connected to an operating crank 84, pivoted as at 85. The operating crank 84 is provided with a cam engaging roller 86 positioned in the path of movement of the respectively associated operating cam. Suitable biasing means, such as a spring 87, is provided to insure the desired contact pressure in switches 51' and 53'. Also, as shown, instead of having the switches 51' and 53' held in the circuit opening position by an over-center spring, as illustrated in Fig. 1, latching means are provided for this purpose. As shown, this latching means comprises latching members 88' and 88 pivoted as at 89 and suitably biased by a spring 90 for movement into the latching position which is shown for the switch 53' in Fig. 2. While it is not essential to my invention, the latching means shown in Fig. 2 is so arranged that the tail 91 of one of the latches 88 of the switch 53', which is the first to be opened by rotation of the cam shaft 20, underlies the tail 92 of the latch 88 of the other switch 51' since this enables a somewhat more compact and simple construction of the seal-in device embodying the parts just described.

For releasing the latches 88 and 88', I provide electromagnetic means comprising a winding 93 which, when energized, is arranged to first hit the latch tail 91 and move this slightly to then engage the latch tail 92 so that both latches may be given a fairly sharp blow in sequence without putting a double tripping load on the plunger of the tripping magnet. In the arrangement shown, as the cam shaft 20 rotates in the direction of the arrow 74, the switch 53' is first opened and the latch 88 associated with this switch is biased by its spring 90 into the latching position illustrated. At this time the tail 91 of the latch 88 moves downward out of the way of the tail 92 of the latch 88' so that, when the switch 51' is subsequently opened, the latch 88' may rotate into the latching position under the bias of its spring 90. With the arrangement shown, it is preferable that the first switch 53' to be moved to the open position be the one the tail of whose latch underlies the tail of the latch of the other switch. If the ends of the latch tails do not overlap but are merely close enough together to be struck simultaneously by the armature when the latches are in the latching position it is immaterial which switch is closed first.

In this embodiment of my invention it will be obvious that, as the cams 81 and 80 rotate one in advance of the other, the switches 53' and 51' will be opened in sequence but, regardless of where the cam shaft 20 stops, at least one of these switches cannot be restrained from closing the motor circuit as both latches will be moved from the restraining position when the circuit of the latch-releasing winding 93 is completed through the circuit breaker auxiliary switch contacts 46, 47 and the contacts 76, 77 of the network protective relays.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination, a device to be operated to two positions, means for actuating said device from one of said positions to the other comprising an electric motor, and means for controlling the energization of said motor comprising two switches arranged to be sequentially operated to the circuit opening position by said motor in response to the actuation of said motor and after actuation of said device to said other position, means for actuating said device from said other position to said one position, and means for returning at least one of said switches to the circuit closing position when said device moves to said one position independently of the stopping position of said motor.

2. In combination, a device to be operated to two positions, means for actuating said device from one of said positions to the other comprising an electric motor, and means for controlling the energization of said motor comprising two switches connected in parallel, means controlled by said motor for opening said switches sequentially after actuation of said device to said other position to effect deenergization of said motor, means for actuating said device from said other position to said one position, and means for returning said switches to the circuit closing position when said device moves to said one position.

3. In combination, a device to be operated comprising a member movable to two positions, and means for actuating said member from one of said positions to the other comprising an electric motor, an energizing circuit for said motor comprising two parallel branches, circuit controlling means in each of said branches, means controlled by said motor for opening said circuit controlling means sequentially after movement of said movable member to said other position to effect deenergization of said motor, means for effecting movement of said movable member from said other position to said one position, electromagnetic means for returning said circuit controlling means to the circuit closing position and a circuit for controlling the energization of said electromagnetic means including switching means operative to the circuit closing position when said movable member moves to said one position.

4. In combination, a device to be operated to a plurality of positions, means for actuating said device from one of said positions to another thereof comprising an electric motor, and means for controlling the energization of said motor comprising two parallel circuits, means controlled by said motor for interrupting said parallel circuits sequentially after actuation of said device to said other position to effect deenergization of said motor, means for returning said device to said one position, and means for completing at least one of said circuits when said device moves to said one position independently of the stopping position of said motor.

5. In combination, a device to be operated to two positions, means for actuating said device from one of said positions to the other comprising an electric motor, and means for controlling the energization of said motor comprising two switches connected in parallel, cam means actuated by said motor for opening said switches sequentially after actuation of said device to said other position to effect deenergization of said motor, means for actuating said device from said other position to said one position, and means for returning at least one of said switches to the circuit closing position when said device moves to said one position independently of the stopping position of said cam means.

6. In combination, a circuit breaker comprising a movable circuit controlling member and means for actuating said member to the circuit closing position comprising an electric motor, an energizing circuit for said motor comprising two parallel branches, a switch in each of said branches, cam means actuated by said motor for opening said switches sequentially after movement of said circuit controlling member to the circuit closing position to effect deenergization of said motor, means for actuating said circuit controlling member to the circuit opening position, electromagnetic means for returning said switches to the circuit closing position, and a circuit for controlling the energization of said electromagnetic means including a switch operated to the circuit closing position in response to the movement of said circuit controlling member to the circuit opening position.

7. In combination, a circuit breaker comprising a movable circuit controlling member and means for actuating said member to the circuit closing position comprising an electric motor, a cam shaft arranged to be actuated by said motor, an energizing circuit for said motor comprising two parallel branches, a switch in each of said branches, means associated with said cam shaft for opening said switches sequentially after movement of said circuit controlling member to the circuit closing position to effect deenergization of said motor, means for retaining said switches in the circuit opening position, means for actuating said circuit controlling member to the circuit opening position, electromagnetic means for returning said switches to the circuit closing position, and a circuit for controlling the energization of said electromagnetic means including a switch operated to the circuit closing position in response to the movement of said circuit controlling member to the circuit opening position.

8. In combination, a movable member, an electric motor for moving said member, a circuit for said motor, parallel connected switches in said circuit, means controlled by said motor for sequentially opening said switches at different points in the path of movement of said member, means for maintaining said switches in the open position independently of the position of said member, and means for closing said switches.

ROBERT W. SMITH.